(12) United States Patent
Allen

(10) Patent No.: US 6,529,233 B1
(45) Date of Patent: Mar. 4, 2003

(54) SYSTEMS AND METHODS FOR REMOTE VIDEO AND AUDIO CAPTURE AND COMMUNICATION

(75) Inventor: Paul G. Allen, Mercer Island, WA (US)

(73) Assignee: Digeo, Inc., Kirkland, WA (US)

( * ) Notice: Subject to any disclaimer, the term of this patent is extended or adjusted under 35 U.S.C. 154(b) by 0 days.

(21) Appl. No.: 09/698,298

(22) Filed: Oct. 27, 2000

Related U.S. Application Data

(60) Provisional application No. 60/237,013, filed on Sep. 29, 2000.

(51) Int. Cl.⁷ .......................... H04N 5/44; H04N 5/232; H04N 7/14
(52) U.S. Cl. .................. 348/211.2; 348/14.02; 348/14.04; 348/375; 348/376; 348/734; 725/133; 725/141
(58) Field of Search .................. 348/14.01, 14.02, 348/14.04, 14.05, 61, 207, 211–213, 222, 373–376, 734, 207.99, 211.99, 211.1, 211.2, 211.4–211.7; 725/131, 133, 139, 141, 151, 153

(56) References Cited

U.S. PATENT DOCUMENTS

| 5,138,649 A | 8/1992 | Krisbergh et al. ............ 379/56 |
| 5,247,580 A | 9/1993 | Kimura ........................ 381/43 |
| 5,283,819 A | 2/1994 | Glick et al. .................... 379/90 |
| 5,325,202 A | 6/1994 | Washino ..................... 348/222 |
| 5,410,326 A | 4/1995 | Goldstein .................... 348/134 |
| 5,491,507 A * | 2/1996 | Umezawa ................. 348/14.02 |
| 5,500,691 A * | 3/1996 | Martin ....................... 348/211 |
| 5,585,850 A * | 12/1996 | Schwaller .................... 455/454 |
| 5,585,865 A | 12/1996 | Amano et al. .............. 348/731 |
| 5,587,735 A | 12/1996 | Ishida et al. ................... 348/14 |
| 5,600,368 A | 2/1997 | Matthews, III ............. 348/143 |
| 5,606,365 A | 2/1997 | Maurinus et al. ........... 348/222 |

(List continued on next page.)

FOREIGN PATENT DOCUMENTS

| JP | 406351016 A | 12/1994 | ............. H04N/7/15 |
| JP | 410336492 A | 12/1998 | ........... H04N/5/225 |
| JP | 411069463 A | 3/1999 | ............. H04Q/9/00 |
| JP | 411234639 A | 8/1999 | ............. H04N/7/14 |
| JP | 411355706 A | 12/1999 | ........... H04N/5/765 |
| JP | 02000151871 A | 5/2000 | ............. H04N/1/00 |
| JP | 02000156869 A | 6/2000 | ............. H04N/9/04 |

*Primary Examiner*—Ngoc-Yen Vu
(74) *Attorney, Agent, or Firm*—Kory D. Christensen; Stoel Rives LLP

(57) ABSTRACT

A remote control for an interactive television system includes an integrated camera, a specifically-designated button for activating the camera, and a wireless transmitter for transmitting video information captured by the camera to the interactive television system. The remote control also includes an activity indicator for visually indicating when the camera is active. A set top box for the interactive television system includes a wireless receiver for receiving the video information and a converter for transforming the video information into a network-compatible video stream for transmission to a network.

14 Claims, 8 Drawing Sheets

U.S. PATENT DOCUMENTS

| | | | | |
|---|---|---|---|---|
| 5,666,159 A | * | 9/1997 | Parulski | 348/211.2 |
| 5,671,267 A | | 9/1997 | August et al. | 379/61 |
| 5,675,390 A | | 10/1997 | Schindler et al. | 248/552 |
| 5,748,238 A | * | 5/1998 | Wakabayashi | 348/373 |
| 5,760,824 A | | 6/1998 | Hicks, III | 348/14 |
| 5,761,604 A | | 6/1998 | Stough | 455/3.2 |
| 5,774,859 A | | 6/1998 | Houser et al. | 704/275 |
| 5,793,416 A | | 8/1998 | Rostoker et al. | 348/17 |
| 5,796,424 A | | 8/1998 | Ely et al. | 348/15 |
| 5,907,322 A | | 5/1999 | Kelly et al. | 345/327 |
| 5,910,815 A | | 6/1999 | Boursier et al. | 348/14 |
| 5,936,679 A | | 8/1999 | Kasahara et al. | 348/553 |
| 5,949,474 A | | 9/1999 | Gerszberg et al. | 348/14 |
| 5,963,245 A | | 10/1999 | McDonald | 348/14 |
| 5,995,155 A | | 11/1999 | Schindler et al. | 348/461 |
| 5,999,207 A | | 12/1999 | Rodriguez et al. | 348/14 |
| 6,009,336 A | | 12/1999 | Harris et al. | 455/566 |
| 6,023,292 A | * | 2/2000 | Wakui | 348/211 |
| 6,069,567 A | | 5/2000 | Zawilski | 340/825.22 |
| 6,072,521 A | | 6/2000 | Harrison et al. | 348/12 |
| 6,073,192 A | | 6/2000 | Clapp et al. | 710/65 |
| 6,075,575 A | | 6/2000 | Schein et al. | 348/734 |
| 6,084,638 A | | 7/2000 | Hare et al. | 348/552 |
| 6,128,033 A | | 10/2000 | Friedel et al. | 348/15 |
| 6,130,726 A | | 10/2000 | Darbee et al. | 348/734 |
| 6,137,525 A | * | 10/2000 | Lee | 348/14.02 |
| 6,177,950 B1 | | 1/2001 | Robb | 348/14 |
| 6,188,985 B1 | | 2/2001 | Thrift | 704/275 |
| 6,204,796 B1 | * | 3/2001 | Chan | 341/176 |
| 6,205,318 B1 | | 3/2001 | Schindler et al. | 455/6.3 |
| 6,219,109 B1 | * | 4/2001 | Raynesford | 348/734 |
| 6,227,974 B1 | | 5/2001 | Eilat et al. | 463/40 |
| 6,243,129 B1 | | 6/2001 | Deierling | 348/15 |
| 6,246,441 B1 | | 6/2001 | Terakado et al. | 348/552 |
| 6,256,019 B1 | | 7/2001 | Allport | 345/169 |
| 6,256,060 B1 | * | 7/2001 | Wakui | 348/211 |
| 6,281,925 B1 | | 8/2001 | Kosaka | 348/14.02 |
| 6,397,388 B1 | * | 5/2002 | Allen | 725/133 |

* cited by examiner

SYSTEMS AND METHODS FOR REMOTE VIDEO AND AUDIO CAPTURE AND COMMUNICATION

RELATED APPLICATIONS

The present application is related to and claims priority from U.S. Provisional Application No. 60/237,013, entitled "Systems, Methods, and Devices for Video and Audio Capture and Communications," filed Sep. 29, 2000, with inventor Paul. G. Allen, which is hereby incorporated by reference in its entirety.

BACKGROUND OF THE INVENTION

1. Field of the Invention

The present invention relates generally to interactive television systems, and more particularly, to systems, methods, and devices for video and audio capture and communication.

2. Description of the Background Art

Prior systems, methods, and devices for capturing and communicating video and audio information have various problems and disadvantages.

Consider conventional "webcam" (web camera) devices available today. Such cameras are designed to be mounted on, or placed near, a computer monitor. Designs for monitor-mounted cameras are shown, for example, in U.S. Design Pat. No. D0363502 to MacMurtrie et al., entitled "Monitor mounted video camera," and No. D0363730 to Flohr et al., entitled "Video camera unit for mounting on a computer monitor." Both of these design patents are hereby incorporated by reference.

A commercially-available "webcam" product that is designed to be placed near a computer monitor is the Logitech Quickcam Pro USB® from Logitech, Inc., of Fremont, Calif. Such camera devices are typically connected via a cable to a port of the computer.

In general, monitor-mounted cameras are advantageous when used to capture images of a user sitting in front of the computer. Nevertheless, they present several problems and disadvantages.

First, it is awkward and difficult for a user to point such cameras in different directions. The user would typically have to be near the camera and reach over to change the camera's orientation. Second, such cameras are typically not very mobile, since they are connected via a physical cable to the computer. Unfortunately, this means that in order to capture an image of a subject, the subject must be physically placed within view of the camera at its fixed location. Third, due to their immobility, such cameras often miss moments of primary interest to users, which are often transitory and do not occur in close proximity to a computer. For instance, a baby walking for the first time in the family room is very unlikely to be captured by such fixed or tethered devices.

Moreover, consider conventional systems and methods where such "webcam" devices are used for video communications. A conventional system would utilize a modem connection from a personal computer to an Internet service provider (ISP). Using such a connection, the captured video information would be transmitted from the personal computer of one user over the Internet to a personal computer of another user. Although this may achieve a rudimentary form of video conferencing between two users, such Internet-based video conferencing is typically unreliable and of uneven bandwidth due to limitations of the Internet.

SUMMARY OF THE INVENTION

The present invention provides systems, methods, and devices for video and audio capture and communication that overcome the above-described problems and disadvantages.

In one aspect of the invention, a remote control for an interactive television system includes an integrated camera, a specifically-designated button for activating the camera, and a wireless transmitter for transmitting video information captured by the camera to the interactive television system. In one embodiment, the remote control includes an activity indicator for visually indicating when the camera is active. A set top box for the interactive television system includes a wireless receiver for receiving the video information. In one embodiment, the wireless transmitter is a high-bandwidth, radio-frequency (RF) transmitter, and the receiver is a high-bandwidth, RF receiver.

In various embodiments, the set top box includes a digital storage device for recording video information received by the wireless receiver in the set top box. In addition, the set top box includes a converter for transforming the video information captured by the camera into a video stream compatible for transmission over a network.

In another aspect of the invention, the remote control includes an integrated microphone, and the wireless transmitter is further configured to transmit audio information captured by the microphone to the interactive television system in response to activation of the camera by the specifically-designated button. The set top box may include a digital recording device for recording audio information received from the microphone, as well as a converter for transforming the audio information into a network-compatible audio stream for transmission to the network.

In yet another aspect of the invention, a system for video capture and communication includes a set top box integrated with a camera and a remote control integrated with a specifically-designated button for activating the camera in the set top box. In one embodiment, the set top box and/or the remote control includes an activity indicator for visually indicating when the camera is active. The set top box may also include an integrated microphone, which is activated by the specifically-designated button or other suitable control.

In still another aspect of the invention, a video signal is captured using a camera integrated with a remote control in response to activation of a specifically-designated button on the remote control. In one embodiment, the remote control displays a visual indication that the camera is active. Thereafter, the video signal is transmitted using a wireless transmitter, which is received by a wireless receiver integrated with a set top box of the interactive television system.

Within the set top box, the video signal is transformed into a video stream of a format compatible for transmission over a network, after which the video stream transmitted from the set top box to the network. The video stream is then transmitted from the network to a second set top box, after which it is transformed into a display-compatible video signal. Finally, the video signal is displayed on a television coupled to the second set top box.

In another aspect, a video signal is captured using a camera integrated with a set top box in response to activation of a specifically-designated button on a remote control. In one embodiment, the remote control and/or the set top box displays a visual indication that the camera is active. The video signal is then transformed within the set top box into a video stream of a format compatible for transmission over a network, after which the video stream transmitted from the set top box to the network. The video stream is then transmitted from the network to a second set top box, after which it is transformed into a display-compatible video signal. Finally, the video signal is displayed on a television coupled to the second set top box.

BRIEF DESCRIPTION OF THE DRAWINGS

Non-limiting and non-exhaustive embodiments of the present invention are described in the Figures, in which.

DETAILED DESCRIPTION OF THE PREFERRED EMBODIMENTS

Embodiments of systems, methods, and devices for video and audio capture and communication are described herein. In the following description, numerous specific details are provided, such as examples of programming, user selections, transactions, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout the following description, reference is made to both video and audio information. It should be understood, however, that the devices, systems, and methods of the present invention may be used to capture and communicate either video or audio information, or both, in various embodiments.

Figure 1:
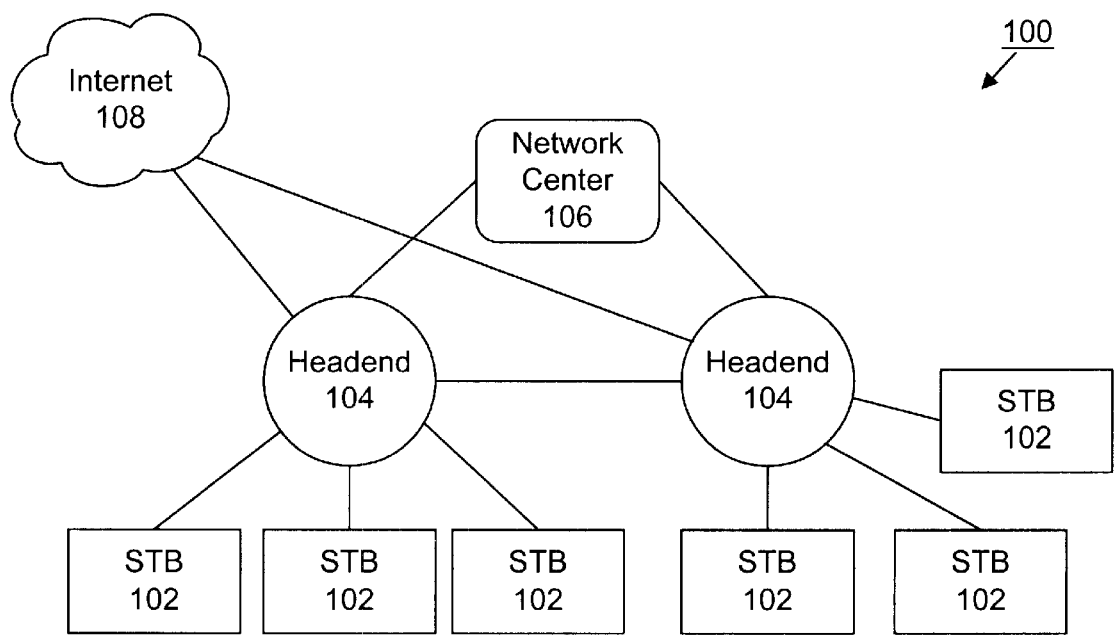
FIG. 1 is a schematic block diagram of a television network according to an embodiment of the invention.

Referring now to FIG. 1, there is shown a television network 100, such as a cable network, according to an embodiment of the invention. In one implementation, the network 100 includes a plurality of set top boxes 102 (hereinafter STB 102) or other client terminals located, for instance, at customer homes. Generally, an STB 102 is consumer electronics device that serves as a gateway between a customer's television and a broadband communication network, such as a cable network. As its name implies, an STB 102 is typically located on top of, or in close proximity to, a customer's television.

In one embodiment, an STB 102 receives encoded video/audio signals (including television signals) from the network 100 and decodes the same for display on the television. Additionally, an STB 102 receives commands from a user (typically via a remote control) and transmits such commands back to the network 100.

In various embodiments, each STB 102 is connected to a headend 104. In the context of cable network, a headend 104 is a centrally-located facility where cable TV (CATV) channels are received from a local CATV satellite downlink and packaged together for transmission to customer homes. In one embodiment, the headend 104 also functions as a Central Office (CO) in the telephone industry, routing video and audio streams and other data to and from the various STBs 102 serviced thereby.

Headends 104 may be coupled directly to one another or through a network center 106. In some cases, headends 104 may be connected via a separate network, one particular example of which is Internet 108. Of course, the illustrated network topology is provided for example purposes only, and other network topologies may be used within the scope of the invention.

As described in greater detail below, an STB 102 may transmit video and audio streams to one or more other STBs 102 connected to the network 100. The communication path for the transmission may involve one or more headends 104, network centers 106, and/or the Internet 108.

For example, a first STB 102 may send a video transmission upstream to a first headend 104, then to a second headend 104, and finally downstream to a second STB 102. The transmission may use various standard protocols, such as MPEG or video over IP (Internet Protocol).

The first and second headends 104 may be one and the same if the STBs 102 are served by the same headend 104. The transmission between headends 104 may occur (i) via a direct peer-to-peer connection between headends 104, (ii) upstream from the first headend 104 to a network center 106 and then downstream to the second headend 104, or (iii) via the Internet 108.

As described in detail hereafter, each STB 102 may be identified by a unique number, code or address, such as an IP (Internet Protocol) address. Thus, a user of one STB 102 may indicate an STB 102 to receive an audio or video transmission by specifying the corresponding address. The network 100 then routes the transmission to its destination using conventional techniques.

Figure 2:
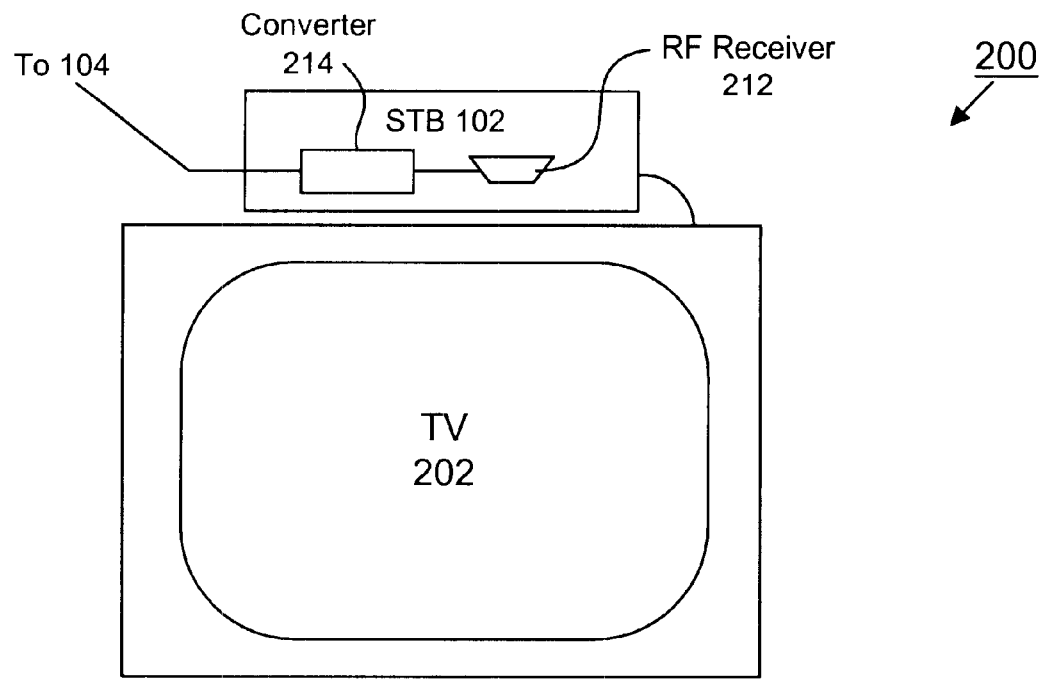
FIG. 2 is a schematic block diagram of an interactive television system according to an embodiment of the invention.
Figure 2:
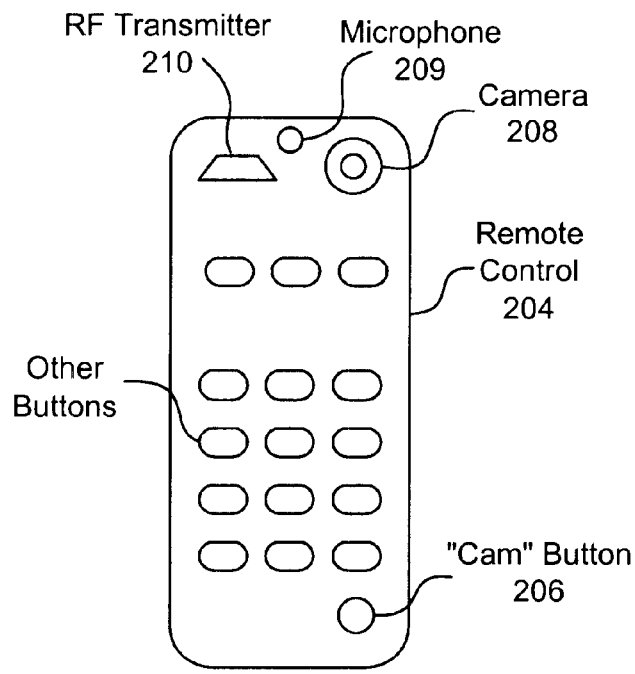

Referring now to FIG. 2, there is shown an interactive television system 200 according to an embodiment of the invention. The television system 200 preferably includes a television 202, which is configured to receive and display standard analog or digital television signals or high-definition television (HDTV) signals. In one embodiment, the television system 200 also includes a STB 102, as discussed above, for sending and receiving audio/video information (including television signals) or other data to and from the network 100. In an alternate embodiment, the functionality of the STB 102 is integrated into an advanced version of the television 202.

In one embodiment, a remote control 204 is provided for convenient remote operation of the STB 102 and the television 202. As described below, the remote control 204 may communicate with the STB 102 and television 202 using conventional techniques to adjust, for example, the volume of the television, the displayed channel, and the like.

In the illustrated embodiment, the remote control 204 includes a camera 208, such as a color (or monochromatic)

digital video camera. In accordance with one embodiment, the camera includes a progressive scan CCD (charge-coupled device) array to deliver digital video up to 320×240 pixels in 24-bit color. Other resolutions and levels of color are also contemplated to be within the scope of the present invention. The resolution and levels of color of the camera may also be adjustable or selectable by the user. Furthermore, a zoom function may be provided for the camera 208. The zoom function may be lens based or preferably digitally based. In addition, the camera may be provided with automatic white balance and automatic exposure features to adjust for lighting and scene content. Such automatic features may be turned off by the user.

The frame rate of the video capture may be 30 frames per second (NTSC, VHS, MPEG), 25 frames per second (PAL), 24 frames per second (motion picture), or other rates. For video conferencing, a frame rate of 8 frames per second provides a workable but noticeably jerky video. Preferably, video conferencing applications using the present invention are performed at a frame rate of at least 10 frames per second for smoother motion. In one embodiment, the MPEG-4 protocol may be used for video conferencing applications using the present invention.

The camera may be used to capture not only video, but also still pictures. Such still-pictures may be stored in JPEG, BMP, TIFF, or other formats in a digital storage device in the STB 102. Alternatively, the remote control 204 itself may include a digital storage device to store such still-pictures. In accordance with one embodiment, the resolution of the camera when used to capture still-pictures may be greater than the resolution when used to capture video.

The camera is preferably disposed on a surface of the remote control 204 to provide a generally unobstructed view for the camera 208. In particular embodiments, the camera may be disposed on the same surface as the majority of the buttons, or it may be disposed on a surface perpendicular to that surface.

In one embodiment, the camera 208 is capable of capturing a series of images in real time and converting the same into analog or digital video signals. The camera 208 is in electrical communication with a specifically-designated button, such as a camera ("cam") button 206, which toggles operation of the camera 208 in one implementation. The remote control 204 may further include additional buttons to control various features of the STB 102 and the television 202. As used herein, the term "button" includes other types of controls, such as switches and the like. In addition, more than one button or control may be provided to activate and deactivate the camera 208.

In one embodiment, the remote control 204 also includes a microphone 209 for receiving sound waves and converting the same into analog or digital audio signals. The microphone 209 may be further in communication with the "cam" button 206 to toggle the operation thereof. Alternatively, the microphone 209 may be enabled through a separate button on the remote control 204.

In the illustrated embodiment, the remote control 204 further includes a radio frequency (RF) transmitter 210. In alternative embodiments, the transmitter 210 may be configured to transmit using infrared (IR), microwave, VHF, UHF, or other frequencies along the electromagnetic spectrum.

In one implementation, the transmitter 210 is in electrical communication with the camera 208 to receive video information captured by the camera 208. The transmitter 210 may further be in electrical communication with the microphone 209 to receive audio information.

The transmitter 210 preferably modulates the video and/or audio information with a carrier frequency to enable transmission of the information to the STB 102 using techniques well known in the art. For example, the transmitter 210 may operate according to the IEEE 802.11a or 802.11b Wireless Networking standards, the "Bluetooth" standard, or according to other standard or proprietary wireless techniques. Modulation techniques may include spread spectrum, frequency shift keying, multiple carrier, or other techniques known in the art.

To achieve modulation and transmission, the transmitter 210 may include various additional components not specifically illustrated but well known in the art. For example, the transmitter 210 may include a source encoder to reduce the amount of bandwidth required, a channel encoder to modulate the video and/or audio information with a carrier wave, and a directional or non-directional transmission antenna. The transmitter 210 may further include an amplifier to increase the transmission signal strength to an appropriate power level.

In accordance with one embodiment, the transmitter 210 comprises an an integrated RF antenna (linear or otherwise configured) etched onto the main printed circuit board of the remote 204. Integration of the antenna with the remote control's circuit board provides for compactness and efficiency in manufacture.

Preferably, the transmitter 210 is a high-bandwidth transmitter capable of sending the video/audio information to the STB 102 in real time. In one embodiment, the transmitter 210 may use wideband frequency modulation over a frequency band to provide a one-way video/audio link from the remote control 204 to the STB 102. For example, frequency band may be within the 890–960 MHz range (GSM), 1990–2110 MHz range or 2400–2500 MHz range or other frequency ranges as approved by FCC regulations. The one-way video/audio link between remote control 204 and STB 102 also provides for efficiency in manufacture, as a two-way video/audio link is not required in accordance with this embodiment. In another embodiment, the transmitter 210 utilizes a frequency division multiplexing (FDM) technique in order to transmit several streams of data simultaneously. These streams may be reassembled at the STB 102 to derive the encoded video/audio information. Various other techniques for providing a high bandwidth in multimedia transmissions may also be used within the scope of the invention.

In one embodiment, the transmitter 210 is configured to broadcast digital signals. As such, the transmitter 210 may include an analog-to-digital converter (ADC) to convert analog video/audio signals from an analog camera system into digital information. The present invention contemplates both the use of analog, or digital, or both types of transmissions from the remote control 204.

In various embodiments, the remote control 204 is also in electrical communication with a processor (not shown) that senses a user's operation of the buttons of the remote control 204 and generates appropriate command signals for transmission to the STB 102 and television 202 in order to control the operation of the same.

In the illustrated embodiment, the STB 102 includes an RF receiver 212, for receiving transmissions from the transmitter 210 in the remote control 204. Such a receiver 212 may include an antenna integrated into a printed circuit board (either a main board or a card coupled to a main board) within the STB 102. The receiver 202 may also demodulate video/audio information from the modulated band transmitted by the remote control 204. In various embodiments, the receiver 212 may be configured to receive IR, microwave, VHF, UHF, or other frequencies. In one embodiment, the receiver 212 demodulates the video/audio information contained within a carrier frequency of the transmission.

The receiver 212 may further include components not specifically illustrated but well known in the art. For example, the receiver 212 may include an antenna for receiving the transmission, an amplifier for increasing the strength of the received signal, and a decoder for separating and demodulating the video and/or audio information from the carrier signal.

In one implementation, the receiver 212 is in electrical communication with a converter 214, which converts the video and/or audio information into a digital video and/or audio stream compatible for transmission over the network 100. The conversion process may include compressing the information to improve transmission speed.

As noted above, the converter 214 is in electrical communication with a headend 104 in order to transmit the network-compatible video/audio stream to one or more other STBs 102 in the network 100. The converter 214 is further configured to receive network-compatible video/audio streams from the network 100 and transform the same into display-compatible video/audio signals for display/playback on the television 202. In particular, the transmission from the STB 102 to the network 100 must be made to be compatible with upstream transmission in the network 100. For example, in a cable distribution network 100, one or more frequency bands (for example from 5 to 30 MHz) may be reserved for upstream transmission. Digital modulation (for example, quadrature amplitude modulation or vestigial sideband modulation) may be used to send digital signals in the upstream transmission. Various protocols, such as MPEG or video over IP, may be used to embed the video/audio stream in the digital signals. Upstream transmission will be accomplished differently for different networks 100. Alternative ways to accomplish upstream transmission include an analog telephone line, ISDN, DSL, and other techniques.

Figure 3:
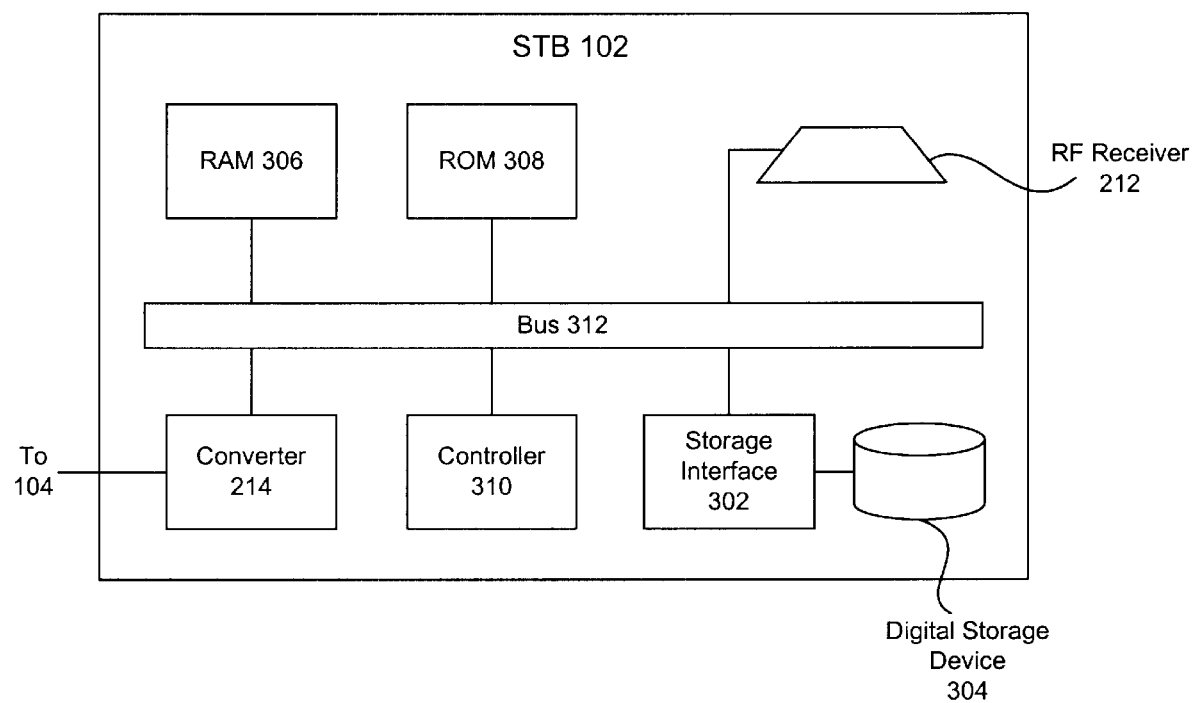
FIG. 3 is a schematic block diagram of a set top box according to an embodiment of the invention.

Referring to FIG. 3, there is shown an expanded block diagram of an STB 102 according to an embodiment of the invention. The STB 102 may include a storage interface 302, which provides access to a digital storage device 304, such as a hard disk drive or the like. In one embodiment, the storage interface 302 receives video/audio information from the receiver 212 and delivers the same to the digital storage device 304 for storage. The video/audio information may be stored in an MPEG format or other encoded file formats. Alternatively, the video/audio information may be converted by the converter 214 into a network-compatible video/audio stream before being stored in the storage device 304.

In one embodiment, the converter 214 includes conventional interface circuitry for communicating with the network 100. In an alternative embodiment, a separate network interface (not shown) may be provided, such as a cable modem or the like. Such a cable modem may operate in accordance with the DOCSIS or DAVIC standards.

The STB 102 may further include a random access memory (RAM) 306 configured to store data for temporary use. Similarly, a read-only memory (ROM) 308 may be provided for storing more permanent data, such as fixed code and configuration information. In one embodiment, the ROM 308 may be used to store an operating system for the STB 102, such as Windows CE® or Linux®.

The STB 102 preferably includes a controller 310 that is in communication with the receiver 212, the converter 214, the storage interface 302, the RAM 306, the ROM 308, and the converter 214. The controller 310 may be coupled to the other components of the STB 102 via a bus 312.

In various embodiments, the controller 310 may be embodied as a microcontroller, a microprocessor, a digital signal processor (DSP) or other device known in the art. The controller 310 manages the operation of the STB 102, including, for example, the conversion of the encoded video/audio information, the storage of the video/audio information, the transmission and reception of video/audio information from the network 100, and the like. As noted above, the controller 310 may perform these and other operations based on control signals generated by the remote control 204 and transmitted to the receiver 212.

In operation, the video/audio information received from the remote control 204 may be displayed directly on the television 202 coupled to the STB 102. As described in greater detail below, the video/audio information may also be converted, compressed and transmitted across the network 100 to one or more other STBs 102 where it is displayed on corresponding televisions 202.

In one embodiment, a user may select which STB(s) 102 will receive a video/audio transmission by entering one or more addresses of the receiving STB(s) 102 using the remote control 204. As noted above, the address of an STB 102 uniquely identifies the STB 102 within the network 100 and is used by the headends 104, network centers 106, and/or the Internet 108 to route a network-compatible video/audio stream to the appropriate STB 102 using conventional techniques.

In various embodiments, an STB 102 may simultaneously send and receive multiple video/audio streams. In this manner, video conferencing of networked interactive television systems 200 is enabled.

Figure 4:
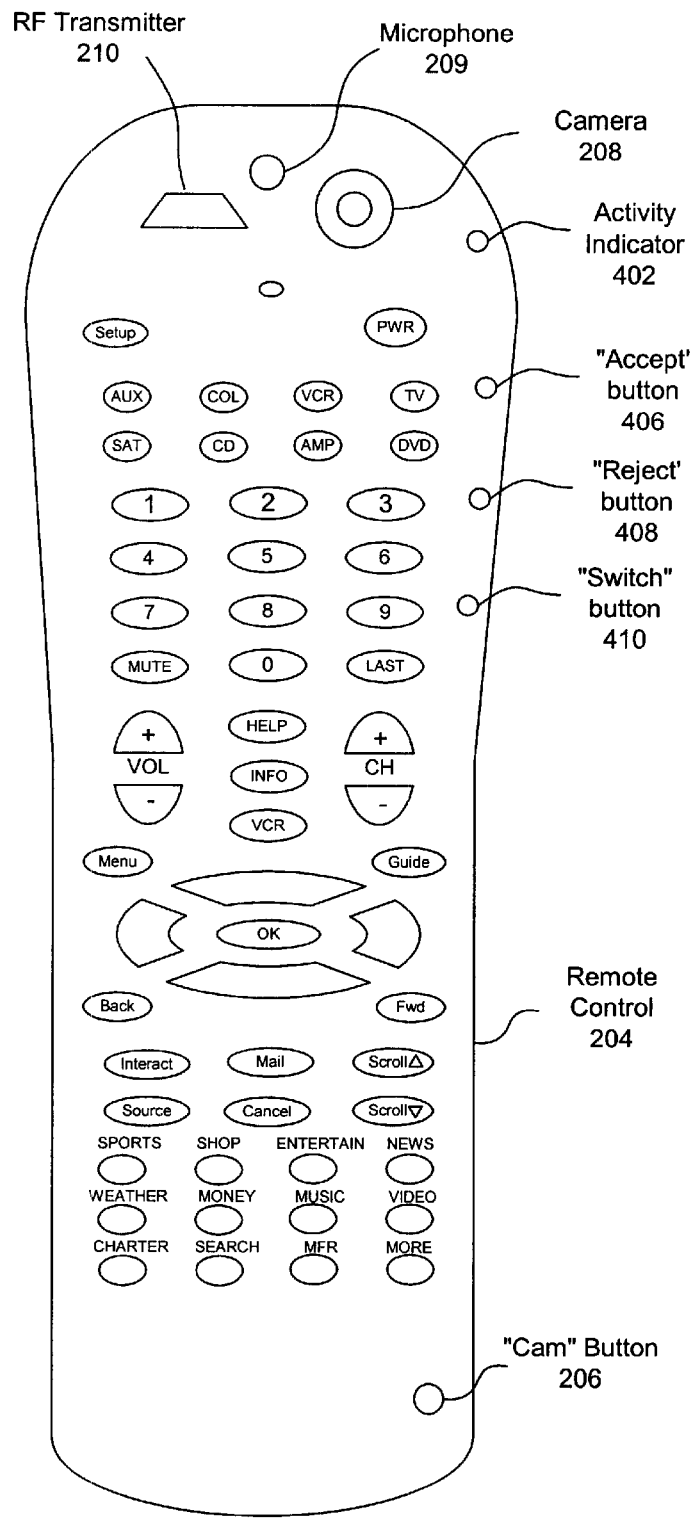
FIG. 4 is a plan view of a remote control according to an embodiment of the invention.

FIG. 4 provides an expanded view of the remote control 204, including the camera 208, the microphone 209, the transmitter 210, and the "cam" button 206. In addition, FIG. 4 illustrates an activity indicator 402, which illuminates or otherwise signals the user when the camera 208 and/or microphone 209 is active. The activity indicator 402 may be embodied as an LED (light-emitting diode) or other suitable indicator. As illustrated, the remote control 204 may include a number of other buttons or controls, such as an "accept" button 406, a "reject" button 408, and a "switch" button 410, the functions of which are described below.

Those skilled in the art will recognize that the various components of the remote control 204 may be positioned in different locations for ergonomics and ease-of-use. For example, the camera 208, "cam" button 206, and activity indicator 402 may be disposed at any convenient and ergonomic location within the remote control 204.

Figure 5:
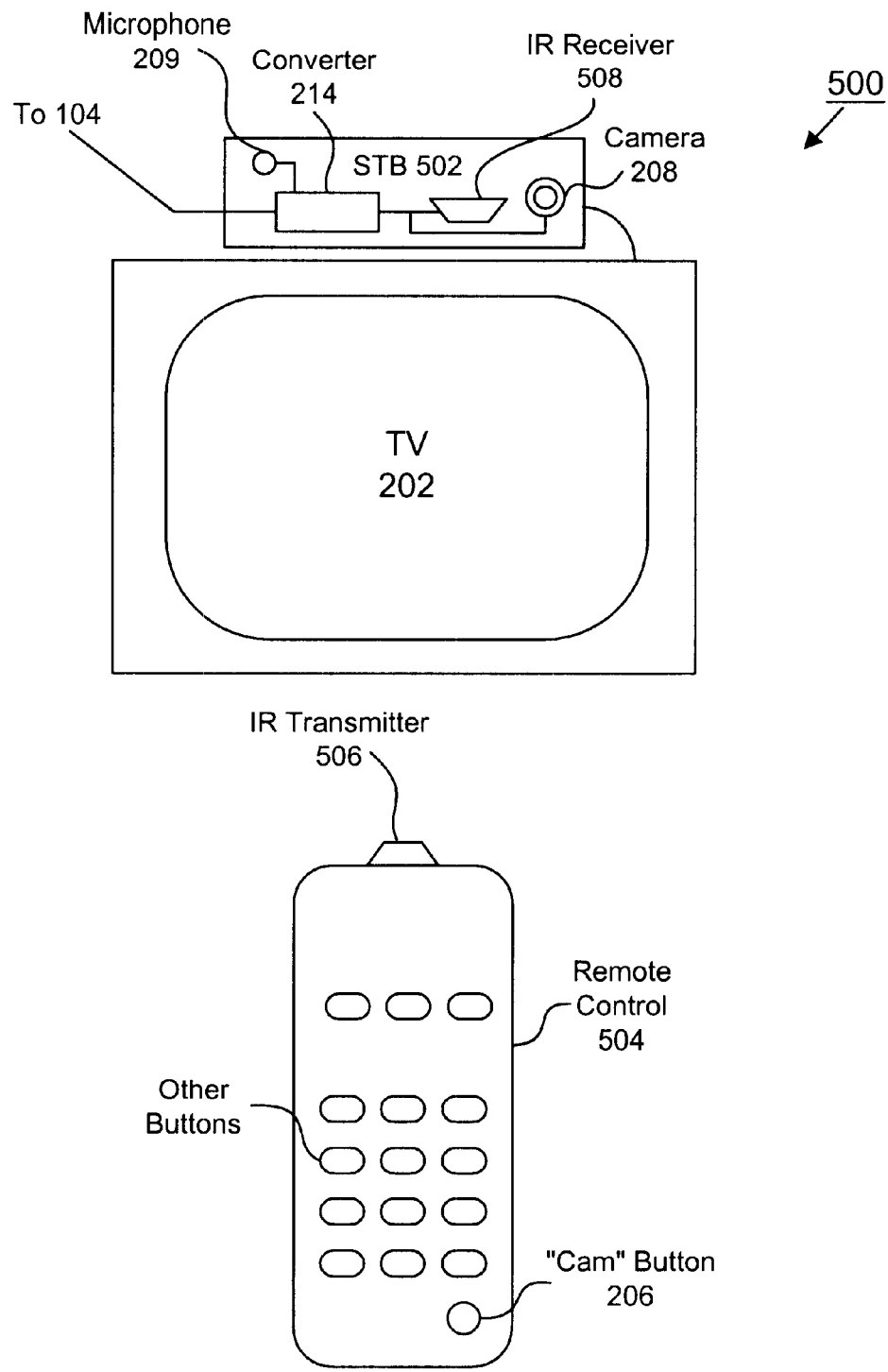
FIG. 5 is a schematic block diagram of an interactive television system according to an embodiment of the invention.

Referring now to FIG. 5, there is shown an alternative interactive television system 500 according to an embodiment of the invention. The television system 500 differs primarily from the television system 200 of FIG. 2 in that the camera 208 and microphone 209 are disposed within a STB 502 rather than a remote control 504.

In the illustrated embodiment, the remote control 504 includes an infrared (IR) transmitter 506 for sending control signals to an IR receiver 508 within the STB 502 and/or the television 202. In alternative embodiments, however, the transmitter may use RF, VHF, UHF, microwave, or other frequencies. In one embodiment, the remote control 504 also includes a "cam" button 206 for enabling remote operation of the camera 208 and/or the microphone 209 disposed within the STB 502. In one embodiment, the same "cam"

button 206 may also be used to de-activate (toggle off) the camera and/or microphone.

Figure 6:
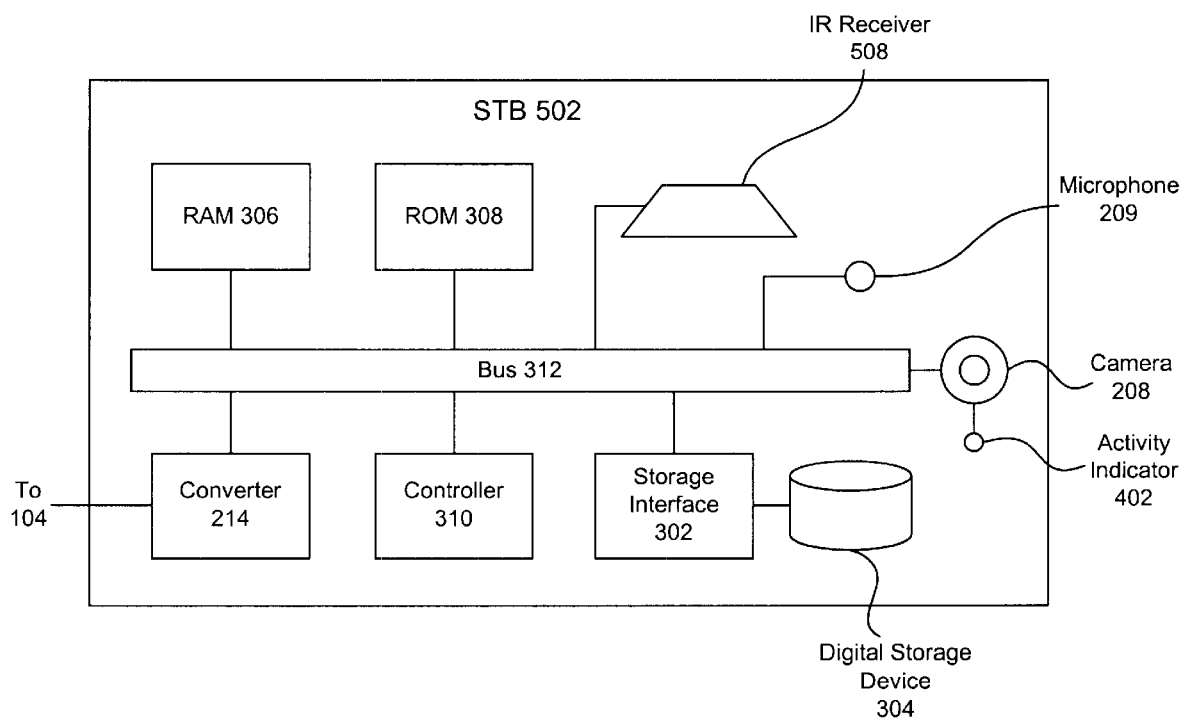
FIG. 6 is a schematic block diagram of a set top box according to an embodiment of the invention.

Referring to FIG. 6, there is shown an expanded block diagram of the STB 502. The converter 214, the storage interface 302, the digital storage device 304, the RAM 306, the ROM 308, and the controller 310 function as previously described with reference to FIG. 3. However, the STB 502 includes a camera 208 and a microphone 209, which are depicted as being in communication with the bus 312. In addition, the STB 502 is depicted as including an activity indicator 402 for visually indicating to a user when the camera is active.

Figure 7:
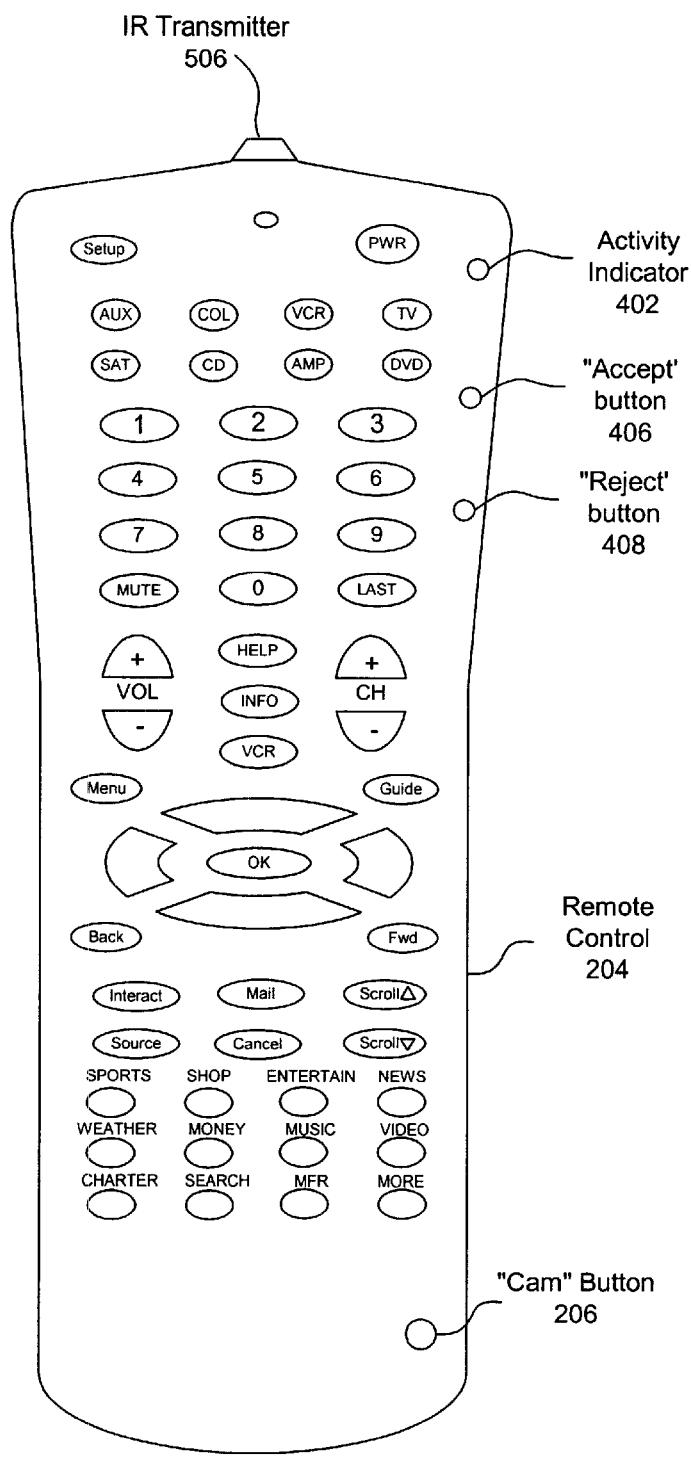
FIG. 7 is a plan view of a remote control according to an embodiment of the invention.

FIG. 7 provides an expanded view of the remote control 504, including the IR transmitter 506, the "cam" button 206, the "accept" button 406 and the "reject" button 408. The remote control 504 may also include a separate activity indicator 402 in addition to the indicator 402 in the STB 502. Those skilled in the art will recognize that the various components of the remote control 504 may be positioned in different locations for convenience and ergonomics.

In yet another alternative embodiment, the remote control 504 and the STB 502 may both be configured with a camera 208 and/or a microphone 209. This would allow a user to select between a camera 208 disposed locally on the remote control 504 and a camera 208 disposed remotely on the STB 102. Thus, a user may conveniently switch between a stationary camera 208 at a fixed distance or a remote-mounted camera 208 that is highly mobile, depending on the subject to be viewed. In one embodiment, the "switch" button 410 of FIG. 4 may be used for this purpose.

Figure 8:
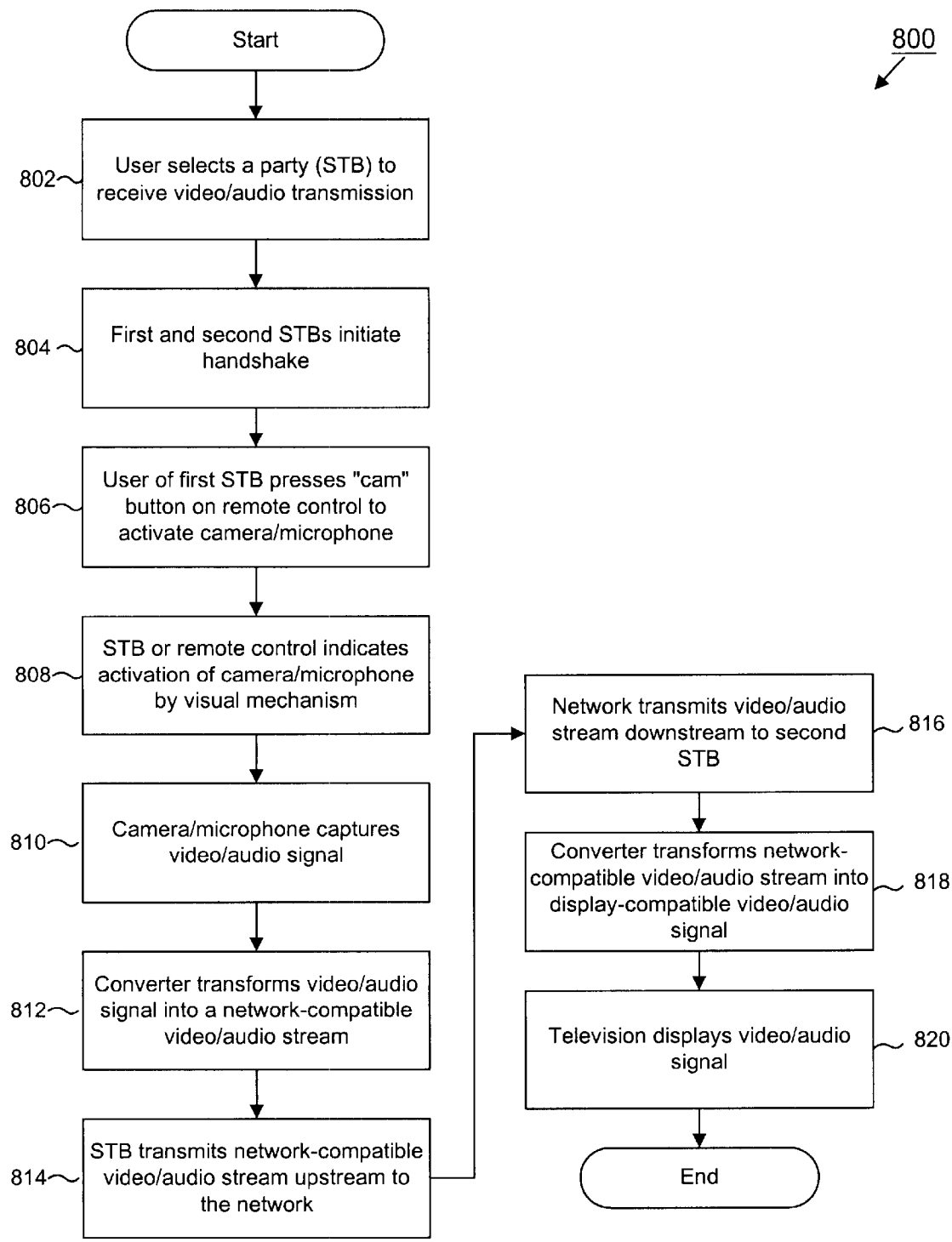
FIG. 8 is a flowchart of a method for video capture and communication according to an embodiment of the invention.

FIG. 8 is a flowchart of a method 800 for video and audio capture and communication according to an embodiment of the invention. The method 800 begins when a user of a first STB 102 selects 802 a second STB 102 (or set of STBs 102) in the network 100 to receive a video/audio transmission. The selection may be performed by entering an identification of the second STB 102 or a user thereof by means the remote control 204. If a user's name is specified, for example, the first STB 102 may access a name server or directory (not shown) to retrieve a corresponding address of the second STB 102. In one embodiment, the first STB 102 may contain a local directory of addresses to which the user frequently sends video/audio transmissions.

Once the first STB 102 has a valid address, it sends a request across the network 100 to the second STB 102. The precise format of the request is not crucial to the invention, but the request should indicate to the second STB 102 that the user of the first STB 102 desires to send a video/audio transmission.

In response to the request, the second STB 102 generates a notification, such as a text message or icon, for display on the corresponding television 202 to notify the user of the second STB 102 of the video/audio transmission. Alternatively, the notification may take the form of an audio signal that is played on a speaker (not shown) in the STB 102 or the television 202.

If the second STB 102 is off-line or otherwise not available, the first STB 102 may wait until a timeout period has expired, after which it notifies the user that the audio/video transmission cannot be sent. Likewise, if the user of the second STB 102 does not respond, or refuses to receive the transmission (by means of the "reject" button 408 of FIG. 4, for example) a not-available signal may be returned to the first STB 102.

If the user of the second STB 102 wishes to receive the video/audio transmission, she may press a suitable button the remote control 204, such as the "accept" button 406 of FIG. 4, which results in an acceptance signal being returned to the first STB 102. In one embodiment, the first STB 102 generates, in response to receiving the acceptance signal, a video or audio acceptance message to notify the user that permission for the video/audio transmission has been granted.

The first and second STBs 102 may then initiate 804 a handshake procedure to establish a communication protocol. Such a handshake procedure may have some similarity with handshake procedures performed between facsimile (fax) machines. In this case, the STBs 102 may negotiate a new protocol or reaffirm an existing protocol for video/audio communication. The appropriate protocol may need to be determined because the two STBs have different video/audio conferencing capabilities. For example, the second STB may be capable of video conferencing at a lower resolution (or frame rate), so the communication protocol would be established as is suitable to this lower resolution (or frame rate). The communication protocol used may also depend on the bandwidth and/or reliability of the connection between the two set top boxes. At this point, an active communication link is established between the STBs 102 across the network 100.

In one embodiment, the first user then activates 806 the camera 208 and/or microphone 209 by pressing, for example, the "cam" button 206. In one implementation, the remote control 204 and/or STB 102 indicates 808 activation of the camera 208 by a visual mechanism, such as an activity indicator 402 (e.g., LED). Thereafter, the camera 208 and/or microphone 209 captures 810 a video and/or audio signal (which is transmitted to the STB 102 in the case of the remote control 204 of FIG. 2).

The converter 214 within the STB 102 then transforms 812 the captured video/audio signal into a network-compatible video/audio stream for transmission over the network 100. Thereafter, the network-compatible video/audio stream is transmitted 814 upstream to the network 100. As noted with reference to FIG. 1, the communication path for the transmission may involve one or more headends 104, network centers 106, and/or the Internet 108, using conventional routing techniques.

In one embodiment, the network-compatible video/audio stream is then transmitted 816 downstream from the network 100 to the second STB 102. Thereafter, the network-compatible video/audio stream is transformed 818 into a display-compatible video/audio signal for display 820 on the television 202.

In a like manner, the second STB 102 may transmit video/audio information to the first STB 102. Indeed, in one embodiment, multiple video/audio streams may be received and transmitted simultaneously by a STB 102. Multiple video streams received by a STB 102 may be displayed on a television 202 at the same time using picture-in-picture (PIP) techniques. Likewise, multiple audio streams may be mixed for playback on the television 202. Thus, video conferencing between two or more users of networked interactive television systems 200 is enabled.

Of course, the above-described method 800 is only one possible technique for video and audio capture and communication within the scope of the invention. In alternative embodiments, the first STB 102 may transmit a video/audio stream to the second STB 102 without waiting for an acceptance signal. The second STB 102 may record all incoming transmissions in the digital storage device 304. Thereafter, a user of the second STB 102 may review the stored video/audio streams and select which stream, if any, to display at a convenient time. This facilitates a form of "videomail."

In yet another alternative embodiment, the first STB 102 may be pre-configured to transmit video/audio information to a second STB 102, which has previously granted permission to receive the transmission. Accordingly, a user of the first STB 102 may simply press the "cam" button 206 to immediately capture video/audio information and transmit the same to the second STB 102 for immediate display.

Alternatively, the video/audio conferencing may occur between the first STB 102 and a client terminal more generically (not just a second STB 102). The client terminal may comprise a personal computer or other device with a connection to the Internet 108. Such other devices may include Internet appliances, personal digital assistants, Internet-enabled cell phones, and the like. These devices are likely to have varying videoconferencing capabilities, so a handshaking procedure as described above is likely to be quite useful in determining a proper communication protocol.

In view of the forgoing, the present invention offers numerous advantages not available in the prior art. By integrating, in a compact manner, a camera 208 and/or microphone 209 with a remote control 204 for an interactive television system 200, a user may easily capture video images of events that would be difficult or impossible to capture with conventional "webcam" devices. Because the remote control 204 is not limited by a physical cable, a user has the flexibility of carrying the remote control 204 to any desired location. Even in an embodiment in which the camera 208 is located in the STB 102, it is likely that a user will be able to capture events of primary interest, since televisions 202 and STBs 102 are normally located in areas of high use, such as family rooms and the like.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A system for video capture and communication comprising:
   a television remote control for an interactive television system, the television remote control comprising a camera, a volume adjustment button for a television, a specifically-designated button for activating the camera, and a wireless transmitter for transmitting video information captured by the camera to the interactive television system in response to activation of the camera by the specifically-designated button; and
   a set top box for the interactive television system, the set top box comprising a wireless receiver for receiving the video information from the wireless transmitter in the television remote control.

2. The system of claim 1, wherein the remote control further comprises an activity indicator for visually indicating when the camera is active.

3. The system of claim 1, wherein the set top box further comprises an activity indicator for visually indicating when the camera is active.

4. The system of claim 1, wherein the wireless transmitter comprises a high-bandwidth, radio-frequency transmitter utilizing a radio-frequency antenna integrated into a circuit board for the device.

5. The system of claim 1, wherein the wireless receiver comprises a high-bandwidth, radio-frequency receiver utilizing a radio-frequency antenna integrated into a circuit board within the set top box.

6. The system of claim 1, wherein the set top box further comprises a digital recording device for recording video information received from the camera in the remote control.

7. The system of claim 1, wherein the set top box further comprises a converter for transforming the video information received from the camera in the remote control into a network-compatible video stream for transmission over a network.

8. The system of claim 1, wherein the remote control further comprises a microphone, and wherein the wireless transmitter transmits audio information captured by the microphone to the interactive television system in response to activation of the camera by the specifically-designated button.

9. The system of claim 8, wherein the set top box further comprises a digital recording device for recording audio information received from the microphone in the remote control.

10. The system of claim 8, wherein the set top box further comprises a converter for transforming the audio information received from the microphone in the remote control into a network-compatible audio stream for transmission over a network.

11. The system of claim 1, wherein the set top box further comprises a camera for capturing video information.

12. The system of claim 11, wherein the remote control further comprises a button for selectively activating the camera in the remote control and the camera in the set top box.

13. A method for video capture and communication comprising:
   in response to activation of a specifically-designated button on a television remote control for an interactive television system, capturing a video signal using a camera integrated with the television remote control, the television remote control comprising a volume adjustment button for a television;
   transmitting the video signal using a wireless transmitter integrated with the television remote control;
   receiving the video signal at a wireless receiver integrated with a set top box for the interactive television system;
   transforming the video signal into a video stream of a format compatible for transmission over a network;
   transmitting the video stream from the set top box to the network;
   transmitting the video stream from the network to a client terminal; and
   recording the video stream received from the network in a digital recording device associated with the client terminal, said recorded video stream comprising a form of videomail.

14. A method for video capture and communication comprising:
   in response to activation of a specifically-designated button on a television remote control for an interactive television system, capturing a video signal using a camera integrated with the television remote control, the television remote control comprising a volume adjustment button for a television;

transmitting the video signal using a wireless transmitter integrated with the remote control;

receiving the video signal at a wireless receiver integrated with a set top box for the interactive television system;

transforming the video signal into a video stream of a format compatible for tranission over a network;

transmitting the video stream from the set top box to the network;

transmitting the video stream from the network to a client terminal; and performing a handshake procedure between the set top box and the client terminal to initiate a video conference between the set top box and the client terminal.

* * * * *